United States Patent
Roundy et al.

(10) Patent No.: US 10,242,187 B1
(45) Date of Patent: Mar. 26, 2019

(54) SYSTEMS AND METHODS FOR PROVIDING INTEGRATED SECURITY MANAGEMENT

(71) Applicant: Symantec Corporation, Mountain View, CA (US)

(72) Inventors: Kevin Roundy, El Segundo, CA (US); Matteo Dell'Amico, Valbonne (FR); Chris Gates, Venice, CA (US); Michael Hart, Farmington, CT (US); Stanislav Miskovic, San Jose, CA (US)

(73) Assignee: Symantec Corporation, Mountain View, CA (US)

(*) Notice: Subject to any disclaimer, the term of this patent is extended or adjusted under 35 U.S.C. 154(b) by 316 days.

(21) Appl. No.: 15/265,750

(22) Filed: Sep. 14, 2016

(51) Int. Cl.
*G06F 21/55* (2013.01)
*G06F 21/56* (2013.01)

(52) U.S. Cl.
CPC .......... *G06F 21/564* (2013.01); *G06F 21/552* (2013.01); *G06F 2221/034* (2013.01)

(58) Field of Classification Search
CPC .... G06F 21/564; G06F 21/552; G06F 21/577; G06F 21/00; G07F 17/3241; H04L 41/28; H04L 63/00; H04L 63/1416
USPC .......................................................... 726/1
See application file for complete search history.

(56) References Cited

U.S. PATENT DOCUMENTS

| | | | | |
|---|---|---|---|---|
| 5,414,833 A * | 5/1995 | Hershey | ................ | H04L 63/145<br>726/22 |
| 6,279,113 B1 * | 8/2001 | Vaidya | ................ | H04L 63/1416<br>709/229 |
| 7,260,844 B1 * | 8/2007 | Tidwell | ................ | G06F 21/577<br>726/22 |
| 8,205,257 B1 * | 6/2012 | Satish | ................ | H04L 63/1416<br>726/22 |
| 8,448,224 B2 * | 5/2013 | Wei | ................ | G06F 21/552<br>370/235 |

(Continued)

OTHER PUBLICATIONS

Kolmogorov—Smirnov test; https://en.wikipedia.org/wiki/Kolmogorov%E2%80%93Smirnov_test, retrieved Oct. 6, 2016; May 4, 2009.

(Continued)

*Primary Examiner* — Kambiz Zand
*Assistant Examiner* — Mahabub S Ahmed
(74) *Attorney, Agent, or Firm* — FisherBroyles, LLP

(57) ABSTRACT

The disclosed computer-implemented method for providing integrated security management may include (1) identifying a computing environment protected by security systems and monitored by a security management system that receives event signatures from the security systems, where a first security system uses a first event signature naming scheme that differs from a second event signature naming scheme used by a second security system, (2) observing a first event signature that originates from the first security system and uses the first event signature naming scheme, (3) determine that the first event signature is equivalent to a second event signature that uses the second event signature naming scheme, and (4) performing, in connection with observing the first event signature, a security action associated with the second event signature and directed to the computing environment. Various other methods, systems, and computer-readable media are also disclosed.

20 Claims, 8 Drawing Sheets

(56) References Cited

U.S. PATENT DOCUMENTS

| | | | |
|---|---|---|---|
| 8,839,435 B1* | 9/2014 | King | H04L 63/1425 726/22 |
| 9,165,142 B1* | 10/2015 | Sanders | G06F 21/566 |
| 9,256,739 B1* | 2/2016 | Roundy | G06F 21/554 |
| 2002/0129140 A1* | 9/2002 | Peled | H04L 63/0245 709/224 |
| 2002/0129264 A1* | 9/2002 | Rowland | H04L 63/102 726/26 |
| 2002/0166049 A1* | 11/2002 | Sinn | G06F 21/33 713/175 |
| 2003/0084349 A1* | 5/2003 | Friedrichs | G06F 21/55 726/22 |
| 2004/0044912 A1* | 3/2004 | Connary | H04L 43/045 726/23 |
| 2004/0064731 A1* | 4/2004 | Nguyen | H04L 41/046 726/22 |
| 2004/0255147 A1* | 12/2004 | Peled | G06F 21/10 726/7 |
| 2005/0015624 A1* | 1/2005 | Ginter | G06F 21/55 726/4 |
| 2007/0136455 A1* | 6/2007 | Lee | G06F 21/564 709/223 |
| 2008/0005798 A1* | 1/2008 | Ross | G06F 21/33 726/26 |
| 2008/0028468 A1* | 1/2008 | Yi | H04L 63/1416 726/23 |
| 2008/0086772 A1* | 4/2008 | Chesla | H04L 63/145 726/23 |
| 2008/0091681 A1* | 4/2008 | Dwivedi | G06F 21/31 |
| 2008/0162592 A1* | 7/2008 | Huang | G06F 11/3476 |
| 2009/0300156 A1* | 12/2009 | Yalakanti | H04L 63/1416 709/223 |
| 2009/0319249 A1* | 12/2009 | White | G09B 19/0053 703/13 |
| 2010/0083382 A1* | 4/2010 | Farley | G06F 21/577 726/24 |
| 2011/0145920 A1* | 6/2011 | Mahaffey | G06F 21/564 726/22 |
| 2011/0234406 A1* | 9/2011 | Young | G08B 21/02 340/573.1 |
| 2012/0110174 A1* | 5/2012 | Wootton | G06F 21/564 709/224 |
| 2012/0137365 A1* | 5/2012 | Lee | G06F 21/564 726/23 |
| 2012/0159564 A1* | 6/2012 | Spektor | H04L 63/08 726/1 |
| 2012/0167162 A1* | 6/2012 | Raleigh | G06F 21/57 726/1 |
| 2013/0067572 A1* | 3/2013 | Muramoto | H04L 63/1408 726/22 |
| 2013/0074143 A1* | 3/2013 | Bu | H04L 63/1416 726/1 |
| 2013/0086682 A1* | 4/2013 | Mahaffey | G06F 21/564 726/23 |
| 2013/0212684 A1* | 8/2013 | Li | G06F 21/577 726/25 |
| 2013/0298244 A1* | 11/2013 | Kumar | G06F 21/52 726/25 |
| 2014/0096246 A1* | 4/2014 | Morrissey | G06F 21/51 726/23 |
| 2015/0074756 A1* | 3/2015 | Deng | H04L 63/1416 726/1 |
| 2015/0074806 A1* | 3/2015 | Roundy | G06F 21/55 726/23 |
| 2015/0096024 A1* | 4/2015 | Haq | H04L 63/145 726/23 |
| 2015/0101044 A1* | 4/2015 | Martin | G06F 21/552 726/22 |
| 2015/0207813 A1* | 7/2015 | Reybok | H04L 63/145 726/22 |
| 2016/0072836 A1* | 3/2016 | Hadden | H04L 63/1441 726/23 |
| 2016/0267270 A1* | 9/2016 | Lee | H04L 63/145 |
| 2017/0026394 A1* | 1/2017 | Bartos | H04L 63/1416 |
| 2017/0068706 A1* | 3/2017 | Bray | G06F 16/24564 |
| 2017/0134406 A1* | 5/2017 | Guo | H04L 63/1416 |
| 2017/0142136 A1* | 5/2017 | Yi | G06F 16/22 |
| 2017/0214701 A1* | 7/2017 | Hasan | H04L 63/1408 |

OTHER PUBLICATIONS

Kevin Alejandro Roundy, et al; Systems and Methods for Detecting Security Threats; U.S. Appl. No. 15/084,522, filed Mar. 30, 2016.

* cited by examiner

SYSTEMS AND METHODS FOR PROVIDING INTEGRATED SECURITY MANAGEMENT

BACKGROUND

Individuals and organizations often seek to protect their computing resources from security threats and corresponding attackers. Accordingly, enterprise organizations may employ a variety of security product solutions, such as endpoint antivirus products and network firewall products. In some examples, a security vendor, acting as a managed security service provider, may effectively manage a bundle of security services for a client. More specifically, in some examples, the managed security service provider may aggregate security incident signatures from a variety of endpoint security products and software security agents, thereby providing a more comprehensive and informative overview of computing resource security and relevant security incidents.

However, frequently an organization may deploy heterogeneous security products from different vendors and/or using differing classification and reporting schemes. The resulting heterogeneous signature sources to be consumed by the managed security service provider may include redundant information that appears distinct, thereby potentially reducing the effectiveness of the managed security service and/or adding confusion, expense, uncertainty, inconsistency, and human error to the administration and configuration of the managed security service.

The instant disclosure, therefore, identifies and addresses a need for systems and methods for providing integrated security management.

SUMMARY

As will be described in greater detail below, the instant disclosure describes various systems and methods for providing integrated security management.

In one example, a computer-implemented method for providing integrated security management may include (i) identifying a computing environment protected by a group of security systems and monitored by a security management system that receives event signatures from each of the security systems, where a first security system within the security systems uses a first event signature naming scheme that differs from a second event signature naming scheme used by a second security system within the security systems, (ii) observing a first event signature that originates from the first security system and uses the first event signature naming scheme, (iii) determining that the first event signature is equivalent to a second event signature that uses the second event signature naming scheme, and (iv) performing, in connection with observing the first event signature, a security action associated with the second event signature and directed to the computing environment based on determining that the first event signature is equivalent to the second event signature.

In some examples, determining that the first event signature that uses the first event signature naming scheme is equivalent to the second event signature that uses the second event signature naming scheme may include: (i) identifying a first co-occurrence profile that describes how frequently the first event signature co-occurs with each of a set of event signatures, (ii) identifying a second co-occurrence profile that describes how frequently the second event signature co-occurs with each of the set of event signatures, and (iii) determining that a similarity between the first co-occurrence profile and the second co-occurrence profile exceeds a predetermined threshold.

In one embodiment, the first co-occurrence profile describes how frequently the first event signature co-occurs with each of the set of event signatures by describing how frequently each of the set of event signatures is observed within a common computing environment and within a predetermined time window when the first event signature occurs within the common computing environment.

In some examples, determining that the first event signature that uses the first event signature naming scheme is equivalent to the second event signature that uses the second event signature naming scheme may include: comparing a name of the first event signature with a name of the second event signature according to a similarity metric and determining, based on comparing the name of the first event signature with the name of the second event signature according to the similarity metric, that a similarity of the name of the first event signature and the name of the second event signature according to the similarity metric exceeds a predetermined threshold.

In some examples, comparing the name of the first event signature with the name of the second event signature may include: (i) identifying a first plurality of terms within the name of the first event signature, (ii) identifying a second plurality of terms within the name of the second event signature, (iii) weighting each term within the first plurality of terms and the second plurality of terms according to an inverse frequency with which each term appears within event signature names produced by the security systems, and (iv) comparing the first plurality of terms as weighted with the second plurality of terms as weighted.

In some examples, comparing the name of the first event signature with the name of the second event signature may include: (i) identifying a first term within the name of the first event signature, (ii) identifying a second term within the name of the second event signature, (iii) determining that the first term and the second term are synonymous, and (iv) treating the first term and the second term as equivalent when comparing the name of the first event signature with the name of the second event signature based on determining that the first term and the second term are synonymous.

In some examples, determining that the first term and the second term are synonymous may include: providing a malware sample to each of a group of malware detection systems and determining that a first malware detection system within the malware detection systems identifies the malware sample using the first term and a second malware detection system within the malware detection systems identifies the malware sample using the second term.

In some examples, determining that the first event signature that uses the first event signature naming scheme is equivalent to the second event signature that uses the second event signature naming scheme may include: identifying a signature association statistic that describes how frequently the first event signature is observed in association with observing the second event signature and how frequently the second event signature is observed in association with observing the first event signature and determining that the signature association statistic exceeds a predetermined threshold.

In one embodiment, performing, in connection with observing the first event signature, the security action associated with the second event signature and directed to the computing environment based on determining that the first event signature is equivalent to the second event signature may include: identifying a security rule that specifies performing the security action at least in part in response to observing the second event signature and enhancing the security rule to respond to the first event signature with the security action.

In one embodiment, performing, in connection with observing the first event signature, the security action associated with the second event signature and directed to the computing environment based on determining that the first event signature is equivalent to the second event signature may include: (i) identifying a first statistical description of how reliably the first event signature indicates a predetermined security condition, (ii) identifying a second statistical description of how reliably the second event signature indicates the predetermined security condition, and (iii) attributing a confidence level to an existence of the predetermined security condition within the computing environment at least in part by generating a merged statistical description of how reliably a class of event signatures that includes the first event signature and the second event signature indicates the predetermined security condition and using the merged statistical description to generate the confidence level upon observing the first event signature within the computing environment.

In one embodiment, performing, in connection with observing the first event signature, the security action associated with the second event signature and directed to the computing environment based on determining that the first event signature is equivalent to the second event signature may include: (i) determining that the security systems within the computing environment collectively support reporting the second event signature to the security management system, (ii) determining, based on determining that the first event signature is equivalent to the second event signature and based on determining that the security systems collectively support reporting the second event signature, that the security systems effectively support reporting the first event signature to the security management system, and (iii) identifying a recommended security product for the computing environment in light of determining that the security systems effectively support reporting the first event signature to the security management system.

In one embodiment, a system for implementing the above-described method may include (i) an identification module, stored in memory, that identifies a computing environment protected by a group of security systems and monitored by a security management system that receives event signatures from each of the security systems, where a first security system within the security systems uses a first event signature naming scheme that differs from a second event signature naming scheme used by a second security system within the security systems, (ii) an observation module, stored in memory, that observes a first event signature that originates from the first security system and uses the first event signature naming scheme, (iii) a determination module, stored in memory, that determines that the first event signature is equivalent to a second event signature that uses the second event signature naming scheme, (iv) a performing module, stored in memory, that performs, in connection with observing the first event signature, a security action associated with the second event signature and directed to the computing environment based on determining that the first event signature is equivalent to the second event signature, and (v) at least one physical processor configured to execute the identification module, the observation module, the determination module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a computing environment protected by a group of security systems and monitored by a security management system that receives event signatures from each of the security systems, where a first security system within the security systems uses a first event signature naming scheme that differs from a second event signature naming scheme used by a second security system within the security systems, (ii) observe a first event signature that originates from the first security system and uses the first event signature naming scheme, (iii) determine that the first event signature is equivalent to a second event signature that uses the second event signature naming scheme, and (iv) perform, in connection with observing the first event signature, a security action associated with the second event signature and directed to the computing environment based on determining that the first event signature is equivalent to the second event signature.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
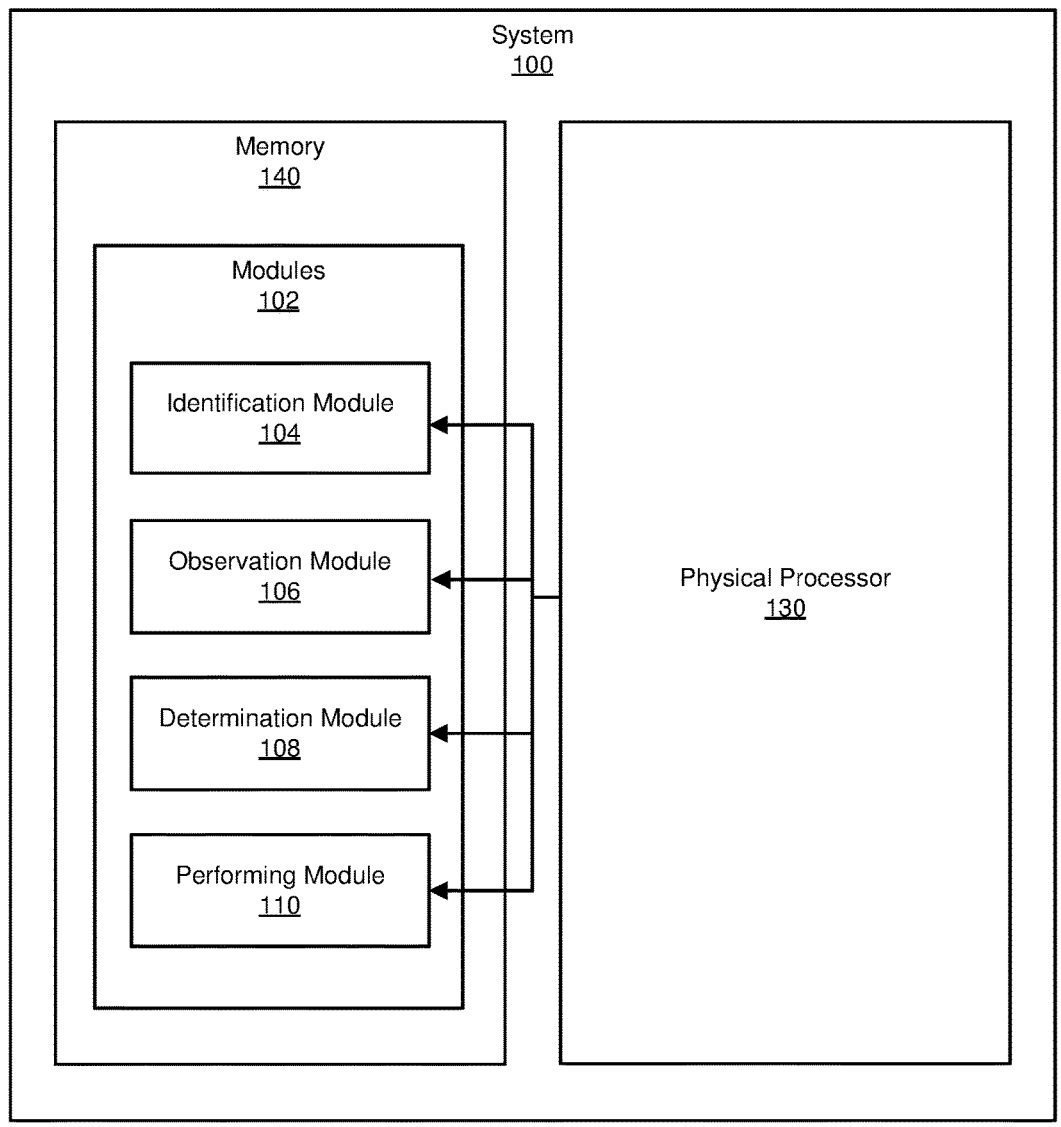
FIG. 1 is a block diagram of an example system for providing integrated security management.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing integrated security management. As will be explained in greater detail below, by identifying equivalent signatures generated by various (e.g., heterogeneous) security systems, the systems and methods described herein may improve the accuracy, consistency, administration, and/or performance of managed security services. For example, identifying equivalent signatures may improve the effectiveness and consistency of rules based on certain signatures by enhancing the rules to respond to equivalent signatures. In some examples, the systems and methods described herein may identify equivalent signatures by determining which signatures occur in the same contexts, by determining which signatures share similar names, and/or by determining which signatures are expected to occur in certain contexts based on a predictive analysis.

By improving the performance, accuracy, and/or consistency of managed security services (e.g., by correctly and/or automatically responding to a signature based on the signature's determined equivalence to another signature), the systems described herein may improve the functioning of a computing device that provides the managed security services. In addition, by improving the performance, accuracy, and/or consistency of managed security services, the systems described herein may improve the function of computing devices that are protected by the managed security services.

In some examples, an organization which deploys various computing security products within an enterprise environment (and/or a security vendor which does so on behalf of the organization) may realize more value from each deployed security product through the application of the systems and methods described herein. In addition, an organization may benefit more immediately from the deployment of a new security product (e.g., by automatically making effective use of signatures generated by the new security product which have not previously been leveraged within the enterprise environment).

The following will provide, with reference to FIGS. 1-2 and 5-6, detailed descriptions of example systems for providing integrated security management. Detailed descriptions of corresponding computer-implemented methods will also be provided in connection with FIG. 3. Detailed descriptions of example illustrations of signature profiles will be provided in connection with FIG. 4. In addition, detailed descriptions of an example computing system and network architecture capable of implementing one or more of the embodiments described herein will be provided in connection with FIGS. 7 and 8, respectively.

FIG. 1 is a block diagram of example system 100 for providing integrated security management. As illustrated in this figure, example system 100 may include one or more modules 102 for performing one or more tasks. For example, and as will be explained in greater detail below, example system 100 may include an identification module 104 that identifies a computing environment protected by a plurality of security systems and monitored by a security management system that receives event signatures from each of the plurality of security systems, where a first security system within the plurality of security systems uses a first event signature naming scheme that differs from a second event signature naming scheme used by a second security system within the plurality of security systems. Example system 100 may additionally include an observation module 106 that observes a first event signature that originates from the first security system and uses the first event signature naming scheme. Example system 100 may also include a determination module 108 that determines that the first event signature is equivalent to a second event signature that uses the second event signature naming scheme. Example system 100 may additionally include a performing module 110 that performs, in connection with observing the first event signature, a security action associated with the second event signature and directed to the computing environment based on determining that the first event signature is equivalent to the second event signature. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, one or more devices within computing environment 206, and/or security management system 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing integrated security management. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
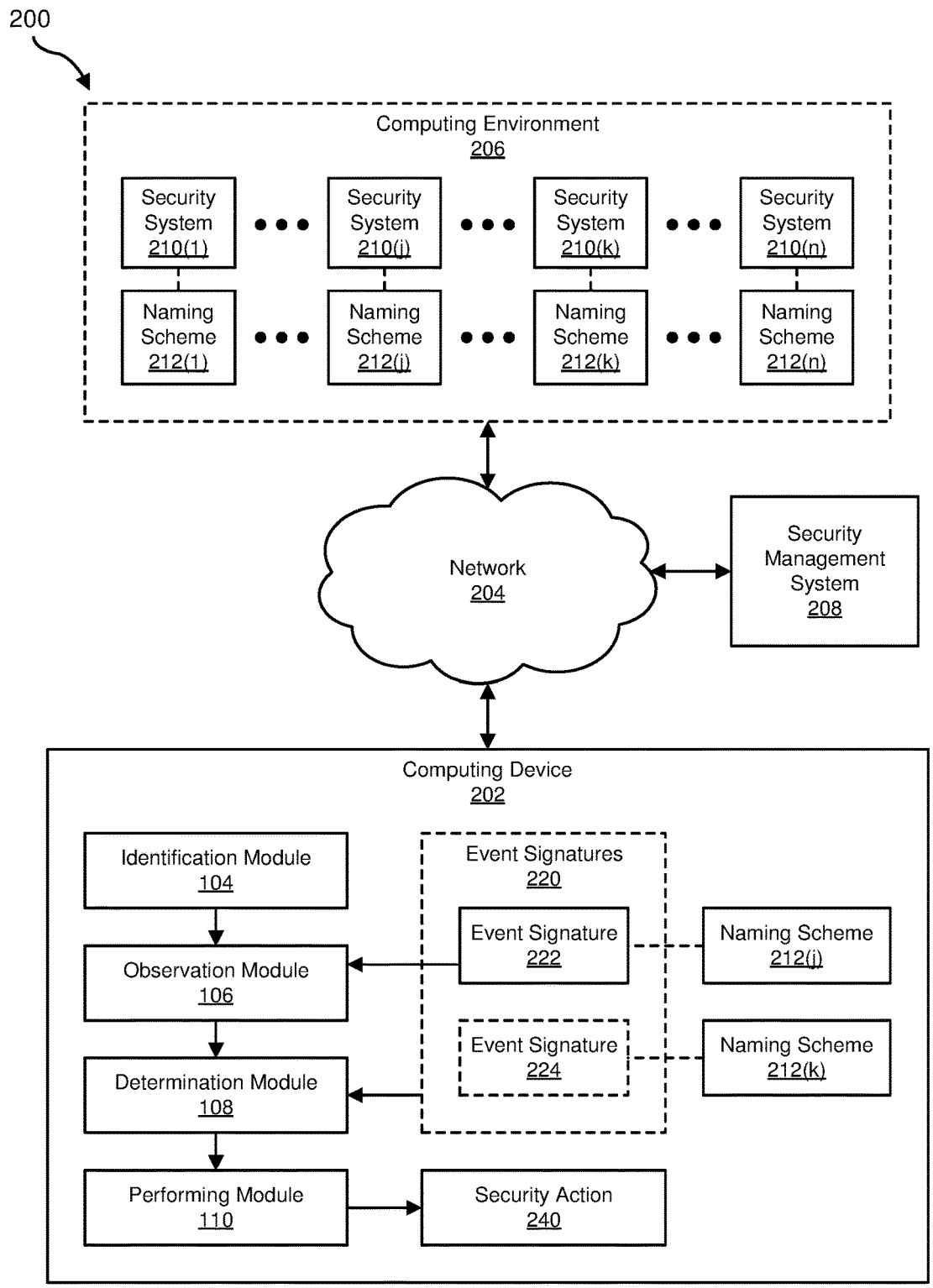
FIG. 2 is a block diagram of an additional example system for providing integrated security management.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a computing environment 206 and/or a security management system 208 via a network 204. In one example, all or a portion of the functionality of modules 102 may be performed by computing device 202, computing environment 206, security management system 208, and/or any other suitable computing system. As will be described in greater detail below, one or more of modules 102 from FIG. 1 may, when executed by at least one processor of computing device 202, computing environment 206, and/or security management system 208, enable computing device 202, computing environment 206, and/or security management system 208 to provide integrated security management. For example, and as will be described in greater detail below, one or more of modules 102 may cause computing device 202 to integrate event signatures 220 generated by security systems 210(1)-(n) to improve the functioning of security management system 208. For example, and as will be described in greater detail below, identification module 104 may identify computing environment 206 protected by security systems 210(1)-(n) and monitored by security management system 208 that receives event signatures 220 from security systems 210(1)-(n), where a security system 210(j) within security systems 210 uses a naming scheme 212(j) that differs from a naming scheme 212(k) used by a security system 210(k) within the security systems 210. Observation module 106 may observe an event signature 222 that originates from security system 210(j) and uses naming scheme 212(j). Determination module 108 may determine that event signature 222 is equivalent to an event signature 224 that uses naming scheme 212(k). Performing module 110 may perform, in connection with observing event signature 222, a security action 240 associated with event signature 224 and directed to computing environment 206 based on determining that event signature 222 is equivalent to event signature 224.

Computing device 202 generally represents any type or form of computing device capable of reading computer-executable instructions. For example, computing device 202 may represent a device providing a security management service. In some examples, computing device 202 may represent a security-vendor-side computing device providing one or more security management services (e.g., for computing environment 206). Additionally or alternatively, computing device 202 may represent a portion of security management system 208. Additional examples of computing device 202 include, without limitation, servers, desktops, laptops, tablets, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Computing environment 206 generally represents any type or form of computing device, collection of computing devices, and/or computing environment provided by one or more computing devices capable of reading computer-executable instructions. For example, computing environment 206 may represent an enterprise network environment that is protected by one or more security systems (e.g., security systems 210(1)-(n)). Examples of computing environment 208 and/or devices that may operate within and/or underlie computing environment 208 include, without limitation, servers, desktops, laptops, tablets, cellular phones, Personal Digital Assistants (PDAs), multimedia players, embedded systems, wearable devices (e.g., smart watches, smart glasses, etc.), gaming consoles, combinations of one or more of the same, example computing system 710 in FIG. 7, or any other suitable computing device, and/or any suitable computing environment provided by such computing devices.

Security management system 208 generally represents any type or form of computing device capable of providing one or more security services and/or processing security-relevant information derived from one or more security systems. In some examples, may represent a device providing a security management service. In some examples, security management system 208 may represent a security-vendor-side computing device providing one or more security management services (e.g., for computing environment 206). Additionally or alternatively, security management system 208 may include computing device 202.

Network 204 generally represents any medium or architecture capable of facilitating communication or data transfer. In one example, network 204 may facilitate communication between computing device 202, computing environment 206, and/or security management system 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
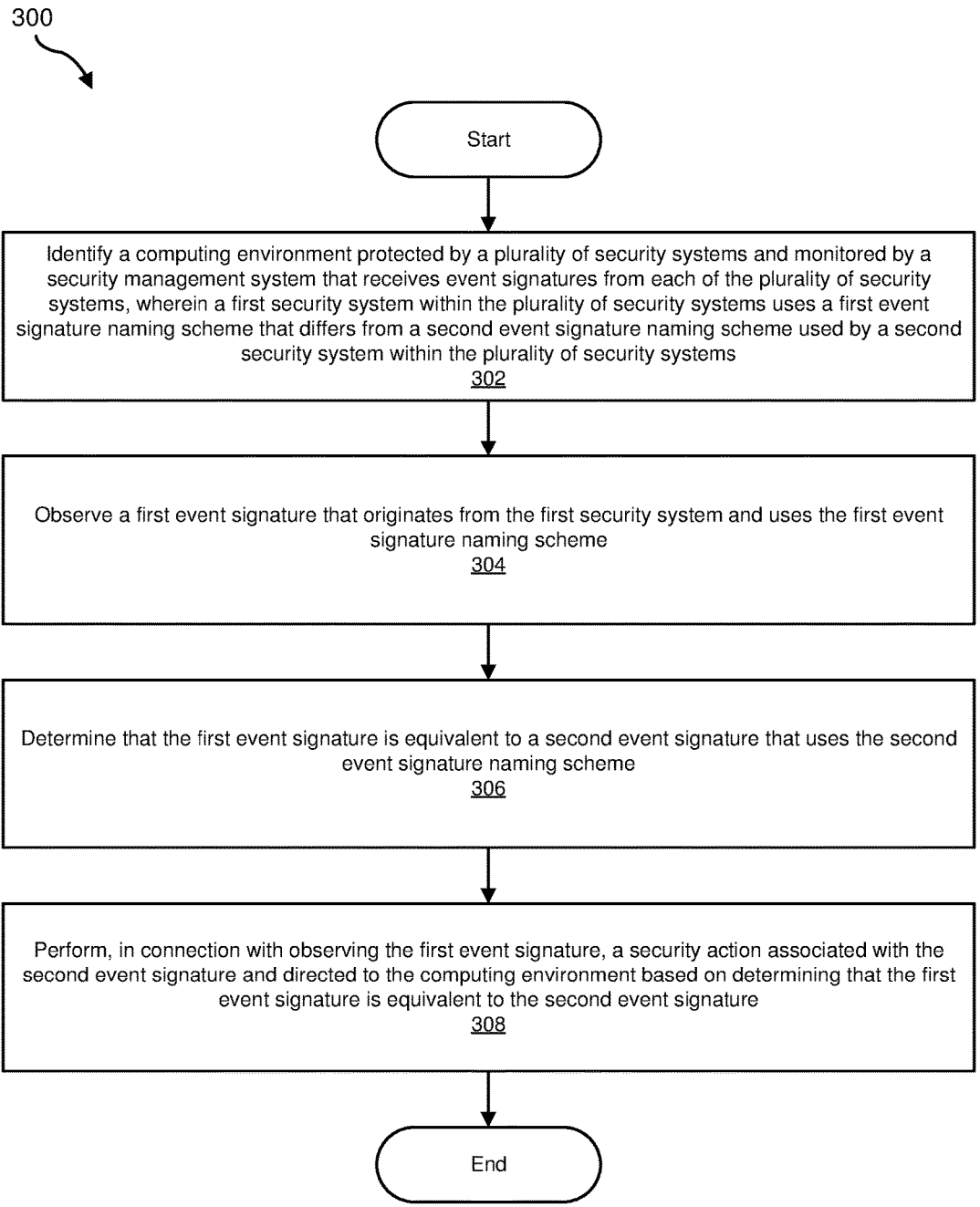
FIG. 3 is a flow diagram of an example method for providing integrated security management.

FIG. 3 is a flow diagram of an example computer-implemented method 300 for providing integrated security management. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a computing environment protected by a plurality of security systems and monitored by a security management system that receives event signatures from each of the plurality of security systems, where a first security system within the plurality of security systems uses a first event signature naming scheme that differs from a second event signature naming scheme used by a second security system within the plurality of security systems. For example, identification module 104 may, as part of computing device 202 in FIG. 2, identify computing environment 206 protected by security systems 210(1)-(n) and monitored by security management system 208 that receives event signatures 220 from security systems 210(1)-(n), where security system 210(j) within security systems 210 uses naming scheme 212(j) that differs from naming scheme 212(k) used by security system 210(k) within the security systems 210.

The term "computing environment," as used herein, generally refers to any environment hosted by, established by, and/or composed of any computing subsystem, computing system, and/or collection of interconnected and/or interoperating computing systems. For example, the term "computing environment" may refer to an enterprise network that is protected by one or more security systems.

The term "security system," as used herein, generally refers to any system that provides computing security and/or that generates computing security information (e.g., that monitors a computing environment for events that are relevant to computing security). Examples of security systems include, without limitation, malware scanners, intrusion detection systems, intrusion prevention systems, firewalls, and access control systems. Examples of security systems may also include, without limitation, systems that log and/or report events that are relevant to computing security determinations.

The term "security management system," as used herein, generally refers to any system that monitors, manages, provides, controls, configures, and/or consumes data from one or more security systems. In some examples, the term "security management system" may refer to a managed security service and/or one or more systems providing a managed security service. For example, the term "security management system" may refer to a system deployed and/or partly administrated by a third-party security vendor. In some examples, the managed security service may perform installations and/or upgrades of security systems within the computing environment, may modify configuration settings of security systems within the computing environment, may monitor the computing environment for threats, and/or may report observed threats and/or vulnerabilities to an administrator of the computing environment and/or to a security vendor. In some examples, the managed security service may perform security actions (e.g., one or more of the security actions discussed above) in response to an aggregation of information received from multiple security products within the computing environment. In some examples, the term "security management system" may refer to a security information and event management system. For example, the security management system may analyze security information generated by one or more security systems to monitor and/or audit the computing environment for threats and/or vulnerabilities by analyzing, in aggregate, information provided by multiple security systems.

As used herein, the term "event" may refer to any event, incident, and/or observation within a computing environment. Examples of events include, without limitation, network communication events (e.g., an attempted communication across a firewall), file system events (e.g., an attempt by a process to create, modify, and/or remove a file), file execution events, system configuration events (e.g., an attempt to modify a system configuration setting), access control events (e.g., a login attempt, an attempt to access a resource where the access requires a permission, etc.), etc. In general, the term "event," as used herein, may refer to any event that may be detected by a security system, reported by a security system, and/or responded to by a security system, and/or which may inform one or more actions taken by a security system and/or a security management system. Accordingly, the term "event signature," as used herein, generally refers to any identifier of an event that is generated by and/or used by a security system. Examples of event signatures include warnings, alerts, reports, and/or log entries generated by security systems. As will be explained in greater detail below, in some examples, an event signature may be associated with an event name. In some examples, the event signature may be represented by and/or include the event name.

Identification module 104 may identify the computing environment in any suitable manner. For example, identification module 104 may identify the computing environment by identifying configuration information that specifies the computing environment. In some examples, identification module 104 may identify the computing environment by communicating with the computing environment. Additionally or alternatively, identification module 104 may identify the computing environment by executing within the computing environment. In some examples, identification module 104 may identify the computing environment by identifying, communicating with, and/or retrieving information generated by one or more of the security systems within the computing environment.

Returning to FIG. 3, at step 304, one or more of the systems described herein may observe a first event signature that originates from the first security system and uses the first event signature naming scheme. For example, observation module 106 may, as part of computing device 202 in FIG. 2, observe an event signature 222 that originates from security system 210(j) and uses naming scheme 212(j).

The phrase "event signature naming scheme," as used herein, generally refers to any mapping between events and names for events and/or any mapping between event signatures and names for event signatures. For example, two different security products may observe the same event and report the same event using different event signatures and/or different names for event signatures. Accordingly, the two different security products may employ differing event signature naming schemes.

Observation module 106 may observe the first event signature in any of a variety of ways. In some examples, observation module 106 may observe the first event signature by observing the first event signature within a log and/or report generated by the first security system. Additionally or alternatively, observation module 106 may observe the first event signature by receiving a communication from the first security system. In some examples, observation module 106 may observe the first event signature within a signature database for the first security system. The signature database may include any data structure that stores event signatures used by the first security system. In some examples, the signature database may be derived from past observations of the first security system (e.g., the signature database may include a compilation of signatures previously observed from the first security system). Additionally or alternatively, the signature database may be derived from documentation that describes the first security system. In some examples, observation module 106 may observe the first event signature by observing a reference to the first event signature maintained by the security management system. For example, the security management system may include a record of the first event signature and/or one or more rules that reference the first event signature.

Returning to FIG. 3, at step 306, one or more of the systems described herein may determine that the first event signature is equivalent to a second event signature that uses the second event signature naming scheme. For example, determination module 108 may, as part of computing device 202 in FIG. 2, determine that event signature 222 is equivalent to event signature 224 that uses naming scheme 212(k).

Determination module 108 may determine that the first event signature is equivalent to the second event signature in any of a variety of ways. In some examples, determination module 108 may determine that the first event signature that uses the first event signature naming scheme is equivalent to the second event signature that uses the second event signature naming scheme by (i) identifying a first co-occurrence profile that describes how frequently the first event signature co-occurs with each of a set of event signatures, (ii) identifying a second co-occurrence profile that describes how frequently the second event signature co-occurs with each of the set of event signatures, and (iii) determining that a similarity between the first co-occurrence profile and the second co-occurrence profile exceeds a predetermined threshold. For example, some observable events within a computing environment may be interrelated, giving rise to observable patterns in events. Thus, the observation of one event may frequently be accompanied by the observation of another event, infrequently accompanied by the observation of yet another event, and almost never accompanied by the observation of yet another event. Accordingly, profiles that indicate the frequency with which each of a spectrum of event signatures occur with a given event signature may act as a fingerprint for an event signature that indicates the underlying event.

Figure 4:
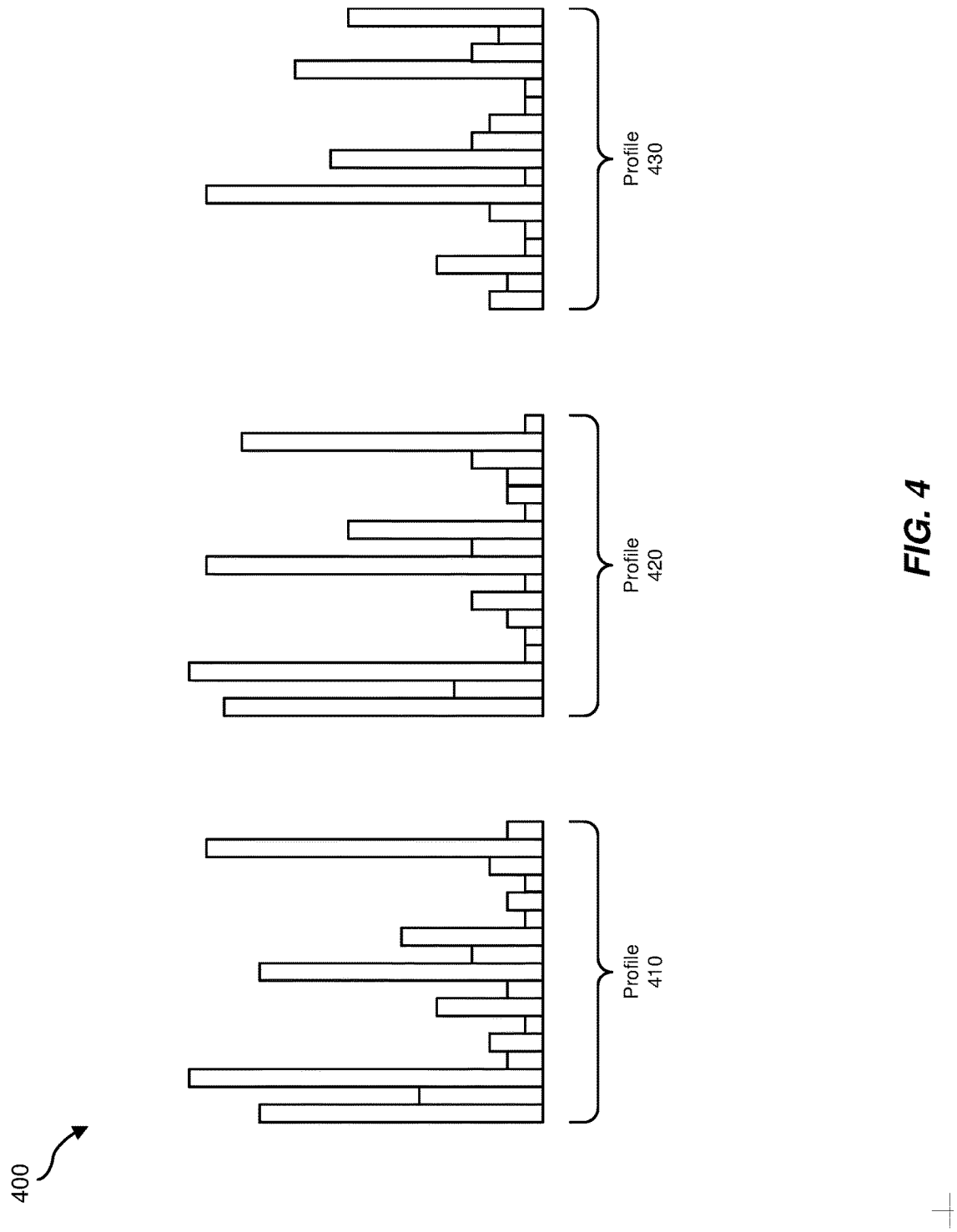
FIG. 4 is a diagram of example signature profiles for providing integrated security management.

To provide an example of co-occurrence profiles, FIG. 4 illustrates a set of profiles 400 (e.g., illustrated as histograms). In one example, a profile 410 may describe an event signature by describing the frequency (e.g., in terms of a percentage) with which other event signatures are observed to co-occur with the profiled event signature (e.g., each bar in the histogram representing a different event signature and the height of each bar representing the frequency with which that event signature is observed to co-occur with the profiled event signature). Profiles 420 and 430 may each represent profiles for different respective event signatures. Profiles 410, 420, and 430 may be built using the same set of event signatures (e.g., the first bar of each histogram may represent the same event signature, the second bar of each histogram may represent the same event signature, etc.). As may be appreciated, profiles 410 and 420 may be more similar to each other than either is to profile 430 (e.g., because they share similar event signature co-occurrence frequencies). Thus, determination module 108 may determine that the event signature profiled by profile 410 is equivalent to the event signature profiled by profile 420 (e.g., that the respective event signatures describe equivalent underlying events and/or the same class of event).

Systems described herein (e.g., observation module 106, determination module 108 and/or the security management system) may determine co-occurrence for the purpose of generating and/or defining the co-occurrence profiles in any suitable manner. For example, a co-occurrence profile may describe how frequently the profiled event signature co-occurs with each of the set of event signatures by describing how frequently each of the set of event signatures is observed within a common computing environment and within a predetermined time window when the profiled event signature occurs within the common computing environment. For example, systems described herein may determine that two event signatures "co-occur" by observing one event signature within an environment (e.g., at a computing device, within a network, etc.) and then observing the other event signature within the same environment and within a predefined period of time (e.g., within a minute, within an hour, within a day). In some examples, systems described herein may use different time and environment scopes to determine co-occurrence for different pairs of event signatures and/or types of event signatures. For example, systems described herein may determine co-occurrence between an event signature originating from an intrusion detection system and other event signatures using a time window of an hour and by observing event signatures that may occur throughout an enterprise network that is protected from intrusion. In another example, systems described herein may determine co-occurrence between an event signature relating to a behavioral malware scanner and other event signatures using a time window of ten minutes and by observing event signatures that may occur at the same computing device.

Determination module 108 may determine that the similarity between the first co-occurrence profile and the second co-occurrence profile exceeds the predetermined threshold using any suitable similarity metric. For example, determination module 108 may compare the co-occurrence profiles by comparing the sum of the differences between the respective frequencies of co-occurrence of each event signature within the set of event signatures. Additionally or alternatively, determination module 108 may generate curves describing the respective co-occurrence profiles and may calculate the similarity of the generated curves (e.g., by calculating the Fréchet distance between the curves). In one example, the co-occurrence profiles may be represented as collections of empirical distribution functions. For example, the co-occurrence between a profiled event signature and each selected event signature within the set of event signatures may be represented as an empirical distribution function that describes the cumulative probability of observing the selected event signature as a function of time. Accordingly, determination module 108 may determine the similarity between two co-occurrence profiles by comparing the respective empirical distribution functions of the two co-occurrence profiles using two-sample Kolmogorov-Smirnov tests.

In some examples, one or more of the systems described herein may build the co-occurrence profiles. For example, systems described herein may build the co-occurrence profiles based on observations within the computing environment. Additionally or alternatively, systems described herein may build the co-occurrence profiles based on observations collected from many computing environments. For example, a backend system owned by a security that provides a managed security service to many customers may collect and aggregate co-occurrence information across customers. Systems described herein may then access co-occurrence information and/or co-occurrence profiles from the backend system. In some examples, co-occurrence information collected at the backend may include information that characterizes the computing environment within which the co-occurrences were observed. In these examples, systems described herein may construct co-occurrence profiles for a computing environment based only on co-occurrence information that came from matching computing environments (e.g., computing environments with a shared set of characteristics).

Determination module 108 may determine that the first and second event signatures are equivalent in any of a variety of additional ways. In some examples, determination module 108 may determine that the first event signature that uses the first event signature naming scheme is equivalent to the second event signature that uses the second event signature naming scheme by comparing a name of the first event signature with a name of the second event signature according to a similarity metric and determining, based on comparing the name of the first event signature with the name of the second event signature according to the similarity metric, that a similarity of the name of the first event signature and the name of the second event signature according to the similarity metric exceeds a predetermined threshold. As used herein, the term "name" may refer to any identifier and/or descriptor of an event and/or an event signature that includes descriptive content characterizing the event and/or the event signature. For example, the name of an event signature may include textual content that describes (e.g., in natural language) the event. In some examples, the event signature may include the event signature name (e.g., the name may itself stand as the signature). Additionally or alternatively, the signature name may be associated with the event signature (e.g., appear alongside the event signature in security system logs).

Determination module 108 may compare the names of the first and second event signatures using any suitable similarity metrics. For example, determination module 108 may calculate the edit distance between the names of the first and second event signatures. In some examples, determination module 108 may use edit distance operations that operate on whole terms within the names (instead of, e.g., only using edit distance operations that operate on single characters). Additionally or alternatively, as will be explained in greater detail below, determination module 108 may normalize the names of the first and/or second event signatures and/or may weight aspects of the names of the first and/or second event signatures before and/or as a part of comparing the names.

In some examples, determination module 108 may compare the name of the first event signature with the name of the second event signature by (i) identifying a first plurality of terms within the name of the first event signature, (ii) identifying a second plurality of terms within the name of the second event signature, (iii) weighting each term within the first plurality of terms and the second plurality of terms according to an inverse frequency with which each term appears within event signature names produced by the plurality of security systems, and (iv) comparing the first plurality of terms as weighted with the second plurality of terms as weighted. As used herein, "inverse frequency" may refer to any value that tends to decrease as the stated frequency increases. For example, determination module 108 may calculate and/or otherwise identify a term frequency-inverse document frequency (TF-IDF) value for each term, where the corpus of documents corresponds to the collection of event signature names produced by the security systems within the computing environment. In this example, determination module 108 may attribute greater distances to operations that modify highly weighted terms when calculating the edit distance between the names of the first and second event signatures (e.g., the attributed cost of each edit operation may correlate to the weight of the term being edited). In this manner, rare term matches may receive greater weight than common term matches when determining the similarity of event signature names.

In some examples, determination module 108 may normalize event signature names before and/or when comparing the names of the first and second event signatures. For example, determination module 108 may compare the name of the first event signature with the name of the second event signature by (i) identifying a first term within the name of the first event signature, (ii) identifying a second term within the name of the second event signature, (iii) determining that the first term and the second term are synonymous, and (iv) treating the first term and the second term as equivalent when comparing the name of the first event signature with the name of the second event signature based on determining that the first term and the second term are synonymous.

Determination module 108 may determine that terms are synonymous in any suitable manner. In some examples, determination module 108 may identify synonymous malware variant names. Because different security products may use a variety of names for any given malware variant, determination module 108 may assess similarity between signature event names more accurately where the signature event names reflect consistent malware variant names. Accordingly, in some examples, one or more of the systems described herein (e.g., determination module 108 and/or the security management system) may determine that the first term and the second term are synonymous by providing a malware sample to each of a plurality of malware detection systems and determining that a first malware detection system within the plurality of malware detection systems identifies the malware sample using the first term and a second malware detection system within the plurality of malware detection systems identifies the malware sample using the second term. In this manner, systems described herein may generate malware variant synonyms with which to normalize signature event names.

Figure 5:
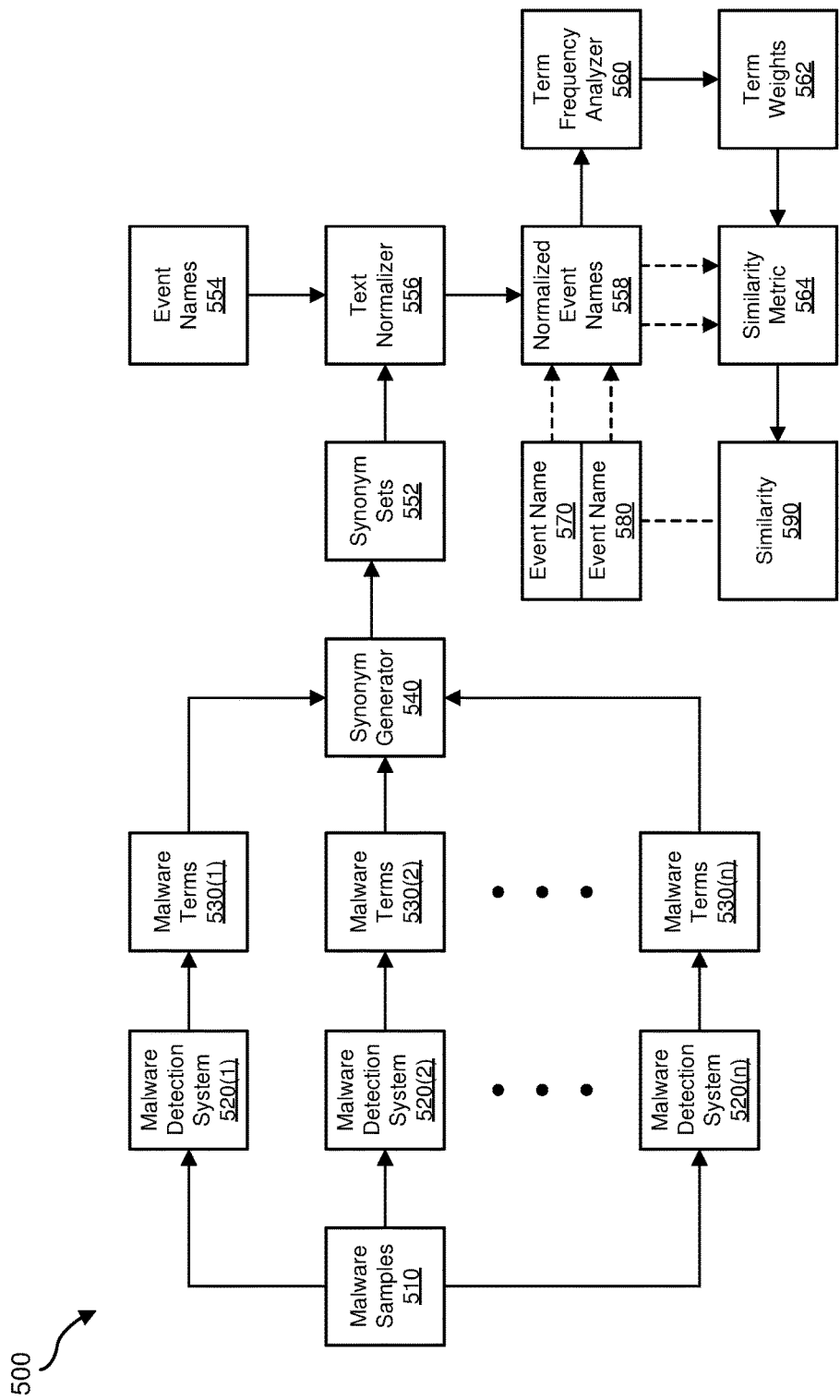
FIG. 5 is a block diagram of an example computing system for providing integrated security management.

FIG. 5 illustrates an example system 500 for determining the equivalence of event signatures. As shown in FIG. 5, example system 500 may include malware samples 510 provided to malware detection systems 520(1)-(n). Malware detection systems 520(1)-(n) may produce, through detection of malware samples 510, respective malware terms 530(1)-(n). A synonym generator 540 may then cross-reference malware terms 530(1)-(n) to produce synonym sets 552, representing sets of synonyms used by malware detection systems 520(1)-(n) for each of malware samples 510. A text normalizer 556 may then normalize event names 554 based on synonym sets 552 (e.g., by choosing, for each malware variant within malware samples 510, a single consistent variant name to represent the malware variant and replacing, within each of event names 554, all synonymous names with the chosen single consistent variant name), thereby producing normalized event names 558. A term frequency analyzer 560 may then process normalized event names 558 to determine the inverse frequency with which terms appear in the normalized event names and, according to the inverse frequency, assign term weights 562 to the terms within the normalized event names. System 500 may then apply a similarity metric 564 (that, e.g., uses term weights 562 when determining similarity) to event names 570 and 580 (as normalized) to determine a similarity 590 of event names 570 and 580. In this manner, systems described herein (e.g., determination module 108) may determine the equivalence of event signatures corresponding to event names 570 and 580, respectively.

Determination module 108 may determine that the first and second event signatures are equivalent in any of a variety of additional ways. In some examples, determination module 108 may determine that the first event signature that uses the first event signature naming scheme is equivalent to the second event signature that uses the second event signature naming scheme by identifying a signature association statistic that describes how frequently the first event signature is observed in association with observing the second event signature and how frequently the second event signature is observed in association with observing the first event signature and determining that the signature association statistic exceeds a predetermined threshold. For example, determination module 108 may simply determine the frequency with which the first event signature and the second event signature co-occur (using, e.g., any of the systems and methods for determining co-occurrence described earlier).

In some examples, determination module 108 may determine that the first and second event signatures are equivalent by using a signature association statistic that includes inferences of event co-occurrences and/or event signature co-occurrences, even absent observed event signature co-occurrences. For example, various security products may be deployed within different computing environments in various combinations. When security products are deployed within a common computing environment, systems described herein (e.g., determination module 108 and/or the security management system) may associate co-occurring signatures within a signature association database. Thus, when a computing environment does not include a security system whose event signatures are included within a signature association database, systems described herein may query the signature association database with event signatures observed within the computing environment to identify associated event signatures that may have been generated by the missing security system had the missing security system been present in the computing environment. The systems described herein may thereby determine that the first and second event signatures are equivalent by using a signature association statistic that is predictive (e.g., that, given an observation of the first event signature, the second event signature would have been observed had the security system corresponding to the second event signature been deployed on the same computing device as the security system corresponding to the first event signature). In some examples, systems described herein may store and/or process event signature association information using locality-sensitive hashing techniques.

Figure 6:
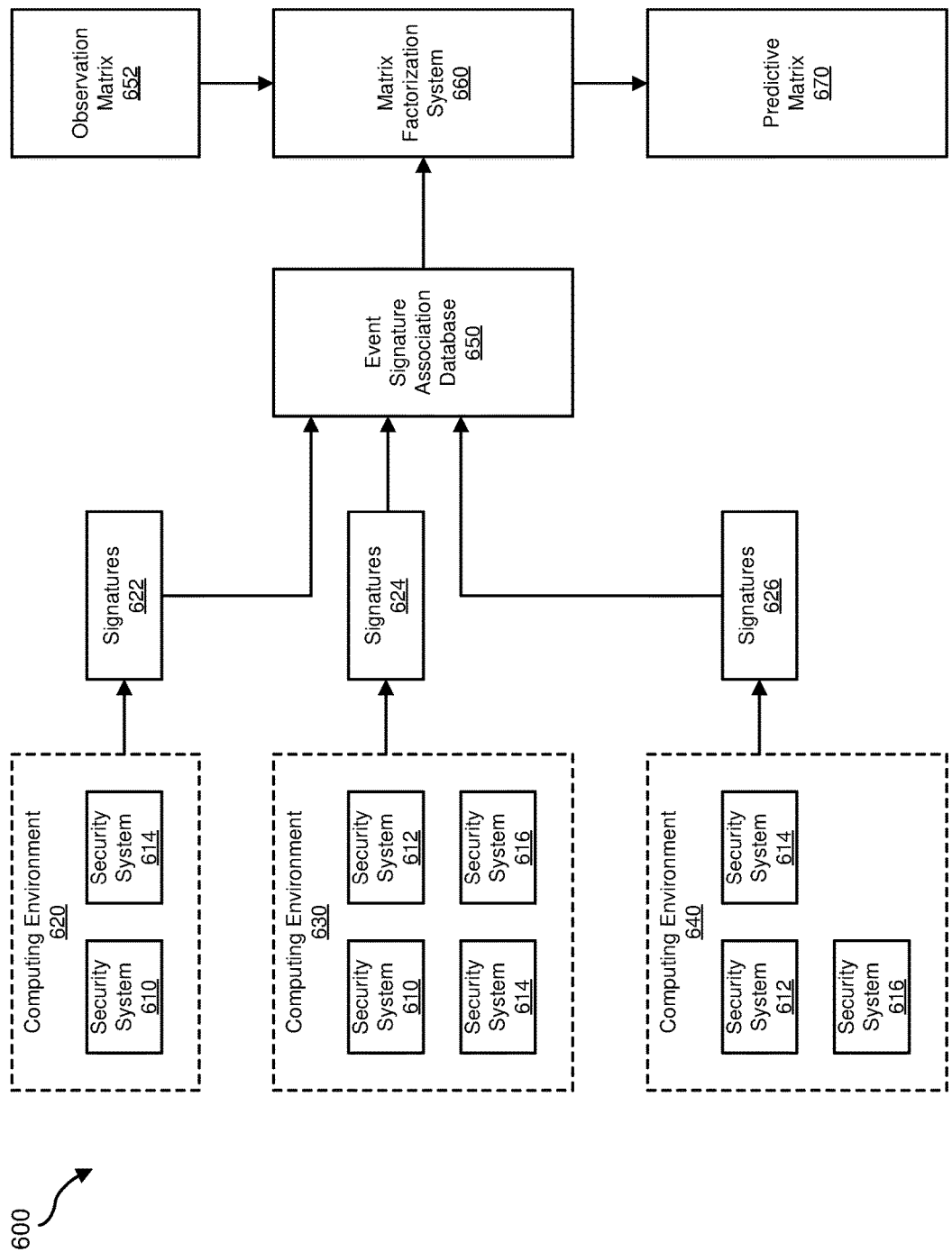
FIG. 6 is a block diagram of an example computing system for providing integrated security management.

For an example of predictive signature associations, FIG. 6 illustrates an example system 600. As shown in FIG. 6, example 600 may include a computing environment 620, a computing environment 630, and a computing environment 640. In some examples, computing environments 620, 630, and 640 may be owned, controlled, and/or administered separately. Additionally or alternatively, computing environments 620, 630, and 640 may represent sub-environments of a larger overarching computing environment. As shown in FIG. 6, computing environment 620 may include security systems 610 and 614. Computing environment 630 may include security systems 610, 612, 614, and 616. Computing environment 640 may include security systems 612, 614, and 616. Security systems 610 and 614 of computing environment 620 may produce signatures 622. Security systems 610, 612, 614, and 616 of computing environment 630 may produce signatures 624. Security systems 612, 614, and 616 of computing environment 640 may produce signatures 626. Systems described herein may submit signatures 622, 624, and 626 (and information about the co-occurrence of the signatures) to event signature association database 650.

Once event signature association database 650 is populated, systems described herein may identify and/or produce an observation matrix 652 from one or more computing environments, such as computing environment 620, 630, and/or 640. Each row of observation matrix 652 may represent a particular computing device on a particular day, and each column of observation matrix 652 may represent a different observable event signature. Each cell of observation matrix 652 may therefore represent whether (or, e.g., how many times) a given event signature was observed on a given computing device on a given day. A matrix factorization system 660 may query event signature association database 650 to determine whether values of cells within observation matrix 652 may be inferred—e.g., whether, given a row, similar rows produced from computing environments that had a security system that provides a given event signature show that the given event signature was observed. The given row, if produced from a computing environment without the security system that provides the given event signature, may be modified to reflect the inference that the given event signature would have been observed if the security system had been deployed to the computing environment. The systems described herein may thereby generate a predictive matrix 670, reflecting observation matrix 652 enhanced with predictive associations. Thus, computing environment 630 may produce event signature information showing that when event signature A from security system 610 and event signature B from security system 614 co-occur, so does event signature C from security system 612. Accordingly, systems described herein may enhance an observation matrix produced by computing environment 620 with the information about signatures 624 submitted by computing environment 630 to event signature association database 650 to reflect that, when security system 610 in computing environment 620 produces event signature A and security system 614 in computing environment 620 produces event signature B, that event signature C may be imputed to computing environment 620, even though computing environment may lack security system 612 that produces event signature C.

In some examples, systems described herein (e.g., determination module 108) may also use the inferred signature associations described above to enhance the event signature profile comparisons described earlier (e.g., with reference to FIG. 4).

Returning to FIG. 3, at step 308, one or more of the systems described herein may perform, in connection with observing the first event signature, a security action associated with the second event signature and directed to the computing environment based on determining that the first event signature is equivalent to the second event signature. For example, performing module 110 may, as part of computing device 202 in FIG. 2, perform, in connection with observing event signature 222, security action 240 associated with event signature 224 and directed to computing environment 206 based on determining that event signature 222 is equivalent to event signature 224.

The term "security action," as used herein, generally refers to any suitable action that a computing system may perform to protect a computing system and/or environment from a computing security threat and/or vulnerability. Examples of security actions include, without limitation, generating and/or modifying a security report, alerting a user and/or administrator, and/or automatically performing (and/or prompting a user or administrator to perform) a remedial action such as updating an antivirus signature set, executing one or more cleaning and/or inoculation scripts and/or programs, enabling, heightening, and/or strengthening one or more security measures, settings, and/or features, reconfiguring a security system, adding and/or modifying a security rule used by a security system, and/or disabling, quarantining, sandboxing, and/or powering down one or more software, hardware, virtual, and/or network computing resources.

Performing module 110 may perform the security action in any of a variety of ways. For example, performing module 110 may perform, in connection with observing the first event signature, the security action associated with the second event signature and directed to the computing environment based on determining that the first event signature is equivalent to the second event signature by identifying a security rule that specifies performing the security action at least in part in response to observing the second event signature and enhancing the security rule to respond to the first event signature with the security action. For example, the security management system may gather event signatures from the security systems within the computing environment and apply rules based on the observed event signatures. The rules may specify actions triggered by event signatures. In some examples, the security management system may generate the rules based on adaptive security techniques. Additionally or alternatively, a security vendor and/or an administrator of the computing environment may create, modify, and/or maintain the rules (e.g., based on reports provided by the security management system populated by information derived by the observed event signatures). However, a rule defined for the security management system may reference and therefore be triggered by a particular event signature without initially being triggered by equivalent event signatures. Thus, following the deployment of a new security product within the computing environment, previously unseen event signatures may be ineffectual. However, by applying a rule that specifies the second event signature upon observing the first event signature based on determining that the first and second event signatures are equivalent, performing module 110 may make effective use of the first event signature.

Performing module 110 may enhance rules in recognition of equivalent event signatures in any of a variety of ways. In some examples, performing module 110 may apply the rule in connection with the first event signature by modifying the rule to reference the first event signature as an alternative to the second event signature. Additionally or alternatively, performing module 110 may modify the rule to reference a class of event signatures that includes the first event signature and the second event signature. In some examples, performing module 110 may create a parallel rule that specifies the first event signature in place of the second event signature. In some examples, performing module 110 may not modify the rule as stored, but may recognize when the rule references the second event signature and treat the first event signature as equivalent to the second event signature. In some examples, performing module 110 may first recommend to an administrator of the computing environment that the first event signature be regarded as equivalent to the second event signature. Additionally or alternatively, performing module 110 may provide an interface to an administrator of the computing environment to enhance one or more rules that reference the second event signature to treat the first event signature as equivalent. In some examples, an administrator may selectively broaden some rules to apply to equivalent signatures but leave other rules unenhanced by equivalence information.

In some examples, performing module 110 may perform the security action in light of the equivalence of the first and second event signatures by increasing a confidence assessment that the first and/or second event signatures call for the security action in light of combined observations of the first and second event signatures. For example, performing module 110 may perform, in connection with observing the first event signature, the security action associated with the second event signature and directed to the computing environment based on determining that the first event signature is equivalent to the second event signature by: (i) identifying a first statistical description of how reliably the first event signature indicates a predetermined security condition, (ii) identifying a second statistical description of how reliably the second event signature indicates the predetermined security condition, and (iii) attributing a confidence level to an existence of the predetermined security condition within the computing environment at least in part by generating a merged statistical description of how reliably a class of event signatures that may include the first event signature and the second event signature indicates the predetermined security condition and using the merged statistical description to generate the confidence level upon observing the first event signature within the computing environment. For example, a relatively small set of observations may indicate that the first event signature appears to be correlated with a malware infection. Another relatively small set of observations may indicate that the second event signature appears to be correlated with the malware infection. Taken alone, either set of observations may be insufficient to warrant a security action. However, taken jointly, a larger set of observations may indicate that an event signature from the equivalence class that includes the first and second event signatures significantly correlates with the malware infection. Accordingly, by recognizing the equivalency between the first and second event signatures, an increased confidence level may lead to a newly justifiable security action to remediate the malware infection.

In some examples, performing module 110 may improve security product recommendations in light of the determined equivalence of the first and second event signatures. For example, performing module 110 may perform, in connection with observing the first event signature, the security action associated with the second event signature and directed to the computing environment based on determining that the first event signature is equivalent to the second event signature by (i) determining that the plurality of security systems within the computing environment collectively support reporting the second event signature to the security management system, (ii) determining, based on determining that the first event signature is equivalent to the second event signature and based on determining that the plurality of security systems collectively support reporting the second event signature, that the plurality of security systems effectively support reporting the first event signature to the security management system, and (iii) identifying a recommended security product for the computing environment in light of determining that the plurality of security systems effectively support reporting the first event signature to the security management system. In some examples, performing module 110 may present a recommendation identifying the recommended security product to an administrator of the computing environment. Additionally or alternatively, performing module 110 may automatically provision the computing environment with the recommended security product. In some examples, performing module 110 may identify the recommended security product to a security vendor (e.g., that provided the security management system) to facilitate a recommendation by the security vendor to an administrator of the computing environment.

As explained above in connection with example method 300 in FIG. 3, systems described herein may use signature co-occurrence statistics to identify signatures that trigger in the same situations, with controls for signatures originating from multiple products. These systems may also match signatures on the basis of signature name similarity by building a thesaurus of synonymous virus names using cross-product testing of samples.

The systems described herein may identify sets of equivalent signatures based on similar signature co-occurrence, signature naming, and matrix factorization. For example, for each signature, the systems described herein may collect statistics about the frequency with which the signature co-occurs with signatures that are triggered by other products. In some examples, co-occurrence may refer to any other signature triggering in relation to the same machine within a short time frame (e.g., 1 hour, or longer, such as 24 hours when selecting only high-confidence signatures). Thus, for each signature, the systems described herein may identify a collection of co-occurring signatures and a count of instances of each, which these systems may normalize and compare to the profiles of other similar signatures (e.g., using the Kolmogorov-Smirnov test). In some contexts, signatures with similar profiles may be expected to trigger in similar contexts and may be at least closely related to one another.

The systems described herein may also perform signature name similarity matching. As a pre-processing step, these systems may feed many malware samples to a broad array of security products to build up a thesaurus of synonymous malware names. After normalizing for synonymous terms, these systems may perform TF-IDF weighting on the words in the signature name, so that rare word matches receive greater importance than common words do in assessing the similarity between a pair of signatures.

In addition, the systems described herein may predict which signatures would have triggered in a particular instance had all security products been deployed, using matrix factorization techniques. On the basis of these predictions, these systems may identify signatures from different products that nearly always trigger together or not at all. These systems may scalably perform the comparisons using locality sensitive hashing techniques.

Figure 7:
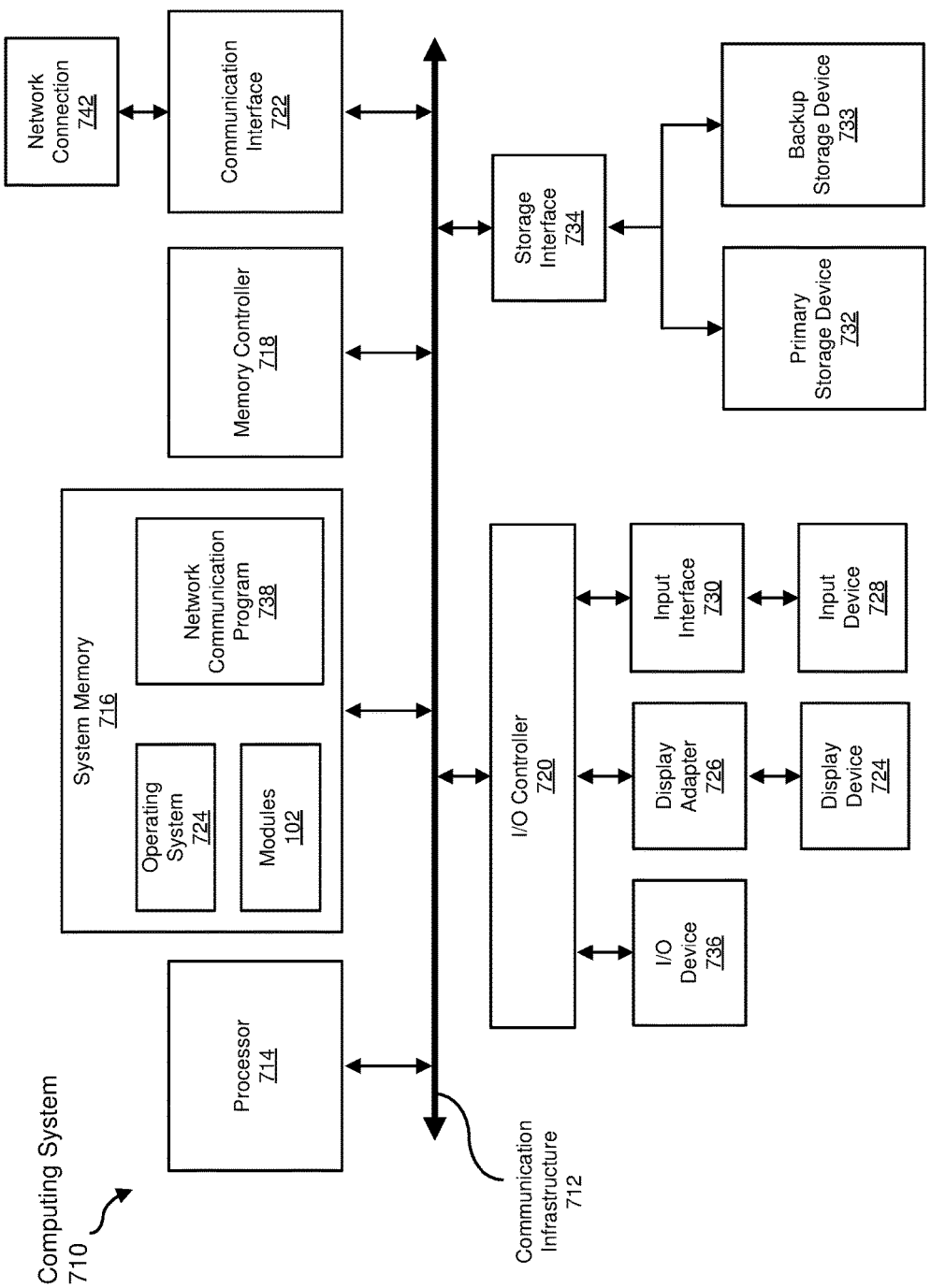
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 724 for execution by processor 714. In one example, operating system 724 may include and/or represent software that manages computer hardware and software resources and/or provides common services to computer programs and/or applications on computing system 710. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
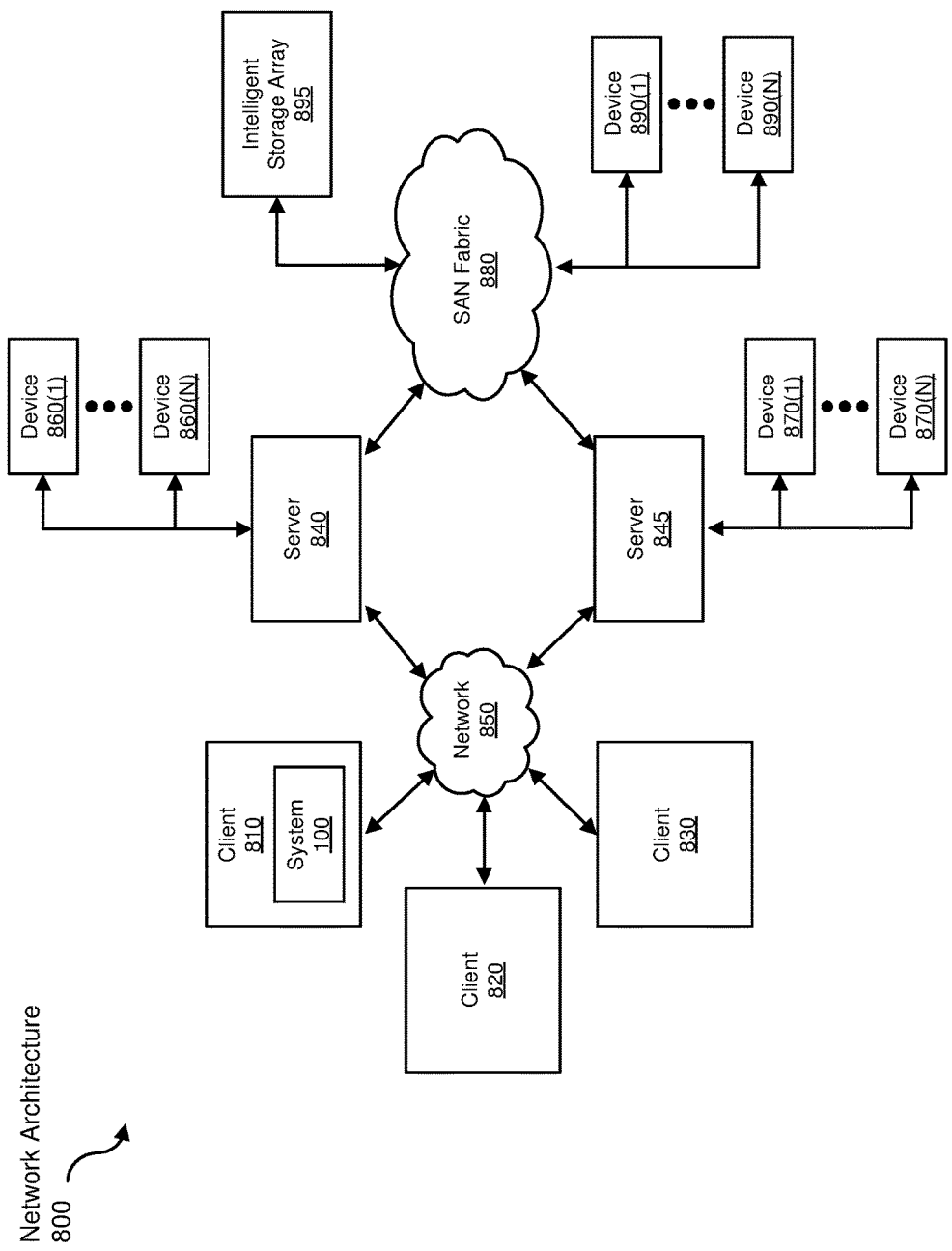
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for providing integrated security management.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive event signatures to be transformed, transform the event signatures, output a result of the transformation to a security management system, use the result of the transformation to execute a security rule, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing integrated security management, at least a portion of the method being performed by a computing device comprising at least one processor, the method comprising:
  identifying a computing environment protected by a plurality of security systems and monitored by a security management system that receives event signatures from each of the plurality of security systems, wherein the plurality of security systems includes a first security system and a second security system that respectively use a first naming scheme and a second naming scheme to name event signatures, the first and second naming schemes differing from each other;
  observing a first event signature that originates from the first security system, the first event signature having been given a first event signature name by the first security system according to the first naming scheme;
  determining that the first event signature is equivalent to a second event signature that has been given a second event signature name by the second security system according to the second naming scheme, the second event signature name being different than the first event signature name; and performing, in connection with observing the first event signature, a security action associated with the second event signature and directed to the computing environment based on determining that the first event signature is equivalent to the second event signature even though the first and second event signature names are different.

2. The computer-implemented method of claim 1, wherein determining that the first event signature that uses the first event signature naming scheme is equivalent to the second event signature that uses the second event signature naming scheme comprises:

identifying a first co-occurrence profile that describes how frequently the first event signature co-occurs with each of a set of event signatures;

identifying a second co-occurrence profile that describes how frequently the second event signature co-occurs with each of the set of event signatures; and determining that a similarity between the first co-occurrence profile and the second co-occurrence profile exceeds a predetermined threshold.

3. The computer-implemented method of claim 2, wherein the first co-occurrence profile describes how frequently the first event signature co-occurs with each of the set of event signatures by describing how frequently each of the set of event signatures is observed within a common computing environment and within a predetermined time window when the first event signature occurs within the common computing environment.

4. The computer-implemented method of claim 1, wherein determining that the first event signature that uses the first event signature naming scheme is equivalent to the second event signature that uses the second event signature naming scheme comprises:

comparing a name of the first event signature with a name of the second event signature according to a similarity metric; and determining, based on comparing the name of the first event signature with the name of the second event signature according to the similarity metric, that a similarity of the name of the first event signature and the name of the second event signature according to the similarity metric exceeds a predetermined threshold.

5. The computer-implemented method of claim 4, wherein comparing the name of the first event signature with the name of the second event signature comprises:

identifying a first plurality of terms within the name of the first event signature;

identifying a second plurality of terms within the name of the second event signature;

weighting each term within the first plurality of terms and the second plurality of terms according to an inverse frequency with which each term appears within event signature names produced by the plurality of security systems; and comparing the first plurality of terms as weighted with the second plurality of terms as weighted.

6. The computer-implemented method of claim 4, wherein comparing the name of the first event signature with the name of the second event signature comprises:

identifying a first term within the name of the first event signature;

identifying a second term within the name of the second event signature;

determining that the first term and the second term are synonymous; and treating the first term and the second term as equivalent when comparing the name of the first event signature with the name of the second event signature based on determining that the first term and the second term are synonymous.

7. The computer-implemented method of claim 6, wherein determining that the first term and the second term are synonymous comprises:

providing a malware sample to each of a plurality of malware detection systems; and determining that a first malware detection system within the plurality of malware detection systems identifies the malware sample using the first term and a second malware detection system within the plurality of malware detection systems identifies the malware sample using the second term.

8. The computer-implemented method of claim 1, wherein determining that the first event signature that uses the first event signature naming scheme is equivalent to the second event signature that uses the second event signature naming scheme comprises:

identifying a signature association statistic that describes how frequently the first event signature is observed in association with observing the second event signature and how frequently the second event signature is observed in association with observing the first event signature; and determining that the signature association statistic exceeds a predetermined threshold.

9. The computer-implemented method of claim 1, wherein performing, in connection with observing the first event signature, the security action associated with the second event signature and directed to the computing environment based on determining that the first event signature is equivalent to the second event signature comprises:

identifying a security rule that specifies performing the security action at least in part in response to observing the second event signature; and enhancing the security rule to respond to the first event signature with the security action.

10. The computer-implemented method of claim 1, wherein performing, in connection with observing the first event signature, the security action associated with the second event signature and directed to the computing environment based on determining that the first event signature is equivalent to the second event signature comprises:

identifying a first statistical description of how reliably the first event signature indicates a predetermined security condition;

identifying a second statistical description of how reliably the second event signature indicates the predetermined security condition; and attributing a confidence level to an existence of the predetermined security condition within the computing environment at least in part by generating a merged statistical description of how reliably a class of event signatures that comprises the first event signature and the second event signature indicates the predetermined security condition and using the merged statistical description to generate the confidence level upon observing the first event signature within the computing environment.

11. The computer-implemented method of claim 1, wherein performing, in connection with observing the first event signature, the security action associated with the second event signature and directed to the computing environment based on determining that the first event signature is equivalent to the second event signature comprises:
  determining that the plurality of security systems within the computing environment collectively support reporting the second event signature to the security management system;
  determining, based on determining that the first event signature is equivalent to the second event signature and based on determining that the plurality of security systems collectively support reporting the second event signature, that the plurality of security systems effectively support reporting the first event signature to the security management system; and
  identifying a recommended security product for the computing environment in light of determining that the plurality of security systems effectively support reporting the first event signature to the security management system.

12. A system for providing integrated security management, the system comprising:
  an identification module, stored in memory, that identifies a computing environment protected by a plurality of security systems and monitored by a security management system that receives event signatures from each of the plurality of security systems, wherein the plurality of security systems includes a first security system and a second security system that respectively use a first naming scheme and a second naming scheme to name event signatures, the first and second naming schemes differing from each other;
  an observation module, stored in memory, that observes a first event signature that originates from the first security system, the first event signature having been given a first event signature name by the first security system according to the first naming scheme;
  a determination module, stored in memory, that determines that the first event signature is equivalent to a second event signature that has been given a second event signature name by the second security system according to the second naming scheme, the second event signature name being different than the first event signature name;
  a performing module, stored in memory, that performs, in connection with observing the first event signature, a security action associated with the second event signature and directed to the computing environment based on determining that the first event signature is equivalent to the second event signature even though the first and second event signature names are different; and
  at least one physical processor configured to execute the identification module, the observation module, the determination module, and the performing module.

13. The system of claim 12, wherein the determination module determines that the first event signature that uses the first event signature naming scheme is equivalent to the second event signature that uses the second event signature naming scheme by:
  identifying a first co-occurrence profile that describes how frequently the first event signature co-occurs with each of a set of event signatures;
  identifying a second co-occurrence profile that describes how frequently the second event signature co-occurs with each of the set of event signatures; and
  determining that a similarity between the first co-occurrence profile and the second co-occurrence profile exceeds a predetermined threshold.

14. The system of claim 13, wherein the first co-occurrence profile describes how frequently the first event signature co-occurs with each of the set of event signatures by describing how frequently each of the set of event signatures is observed within a common computing environment and within a predetermined time window when the first event signature occurs within the common computing environment.

15. The system of claim 12, wherein the determination module determines that the first event signature that uses the first event signature naming scheme is equivalent to the second event signature that uses the second event signature naming scheme by:
  comparing a name of the first event signature with a name of the second event signature according to a similarity metric; and
  determining, based on comparing the name of the first event signature with the name of the second event signature according to the similarity metric, that a similarity of the name of the first event signature and the name of the second event signature according to the similarity metric exceeds a predetermined threshold.

16. The system of claim 15, wherein the determination module compares the name of the first event signature with the name of the second event signature by:
  identifying a first plurality of terms within the name of the first event signature;
  identifying a second plurality of terms within the name of the second event signature;
  weighting each term within the first plurality of terms and the second plurality of terms according to an inverse frequency with which each term appears within event signature names produced by the plurality of security systems; and
  comparing the first plurality of terms as weighted with the second plurality of terms as weighted.

17. The system of claim 15, wherein the determination module compares the name of the first event signature with the name of the second event signature by:
  identifying a first term within the name of the first event signature;
  identifying a second term within the name of the second event signature;
  determining that the first term and the second term are synonymous; and
  treating the first term and the second term as equivalent when comparing the name of the first event signature with the name of the second event signature based on determining that the first term and the second term are synonymous.

18. The system of claim 17, wherein the determination module determines that the first term and the second term are synonymous by:
  providing a malware sample to each of a plurality of malware detection systems; and
  determining that a first malware detection system within the plurality of malware detection systems identifies the malware sample using the first term and a second malware detection system within the plurality of malware detection systems identifies the malware sample using the second term.

19. The system of claim 12, wherein the determination module determines that the first event signature that uses the first event signature naming scheme is equivalent to the second event signature that uses the second event signature naming scheme by:

identifying a signature association statistic that describes how frequently the first event signature is observed in association with observing the second event signature and how frequently the second event signature is observed in association with observing the first event signature; and determining that the signature association statistic exceeds a predetermined threshold.

20. A non-transitory computer-readable medium comprising one or more computer-readable instructions that, when executed by at least one processor of a computing device, cause the computing device to:

identify a computing environment protected by a plurality of security systems and monitored by a security management system that receives event signatures from each of the plurality of security systems, wherein the plurality of security systems includes a first security system and a second security system that respectively use a first naming scheme and a second naming scheme to name event signatures, the first and second naming schemes differing from each other;

observe a first event signature that originates from the first security system, the first event signature having been given a first event signature name by the first security system according to the first naming scheme;

determine that the first event signature is equivalent to a second event signature that has been given a second event signature name by the second security system according to the second naming scheme, the second event signature name being different than the first event signature name; and perform, in connection with observing the first event signature, a security action associated with the second event signature and directed to the computing environment based on determining that the first event signature is equivalent to the second event signature even though the first and second event signature names are different.

* * * * *